A. J. PETERSON.
TRACTOR BELT MECHANISM.
APPLICATION FILED APR. 11, 1918.
1,325,858.
Patented Dec. 23, 1919.
2 SHEETS—SHEET 1.
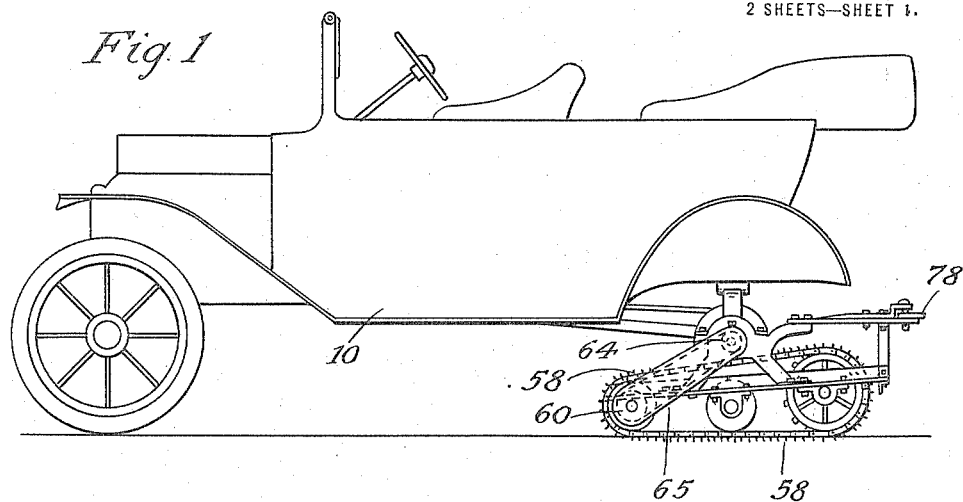
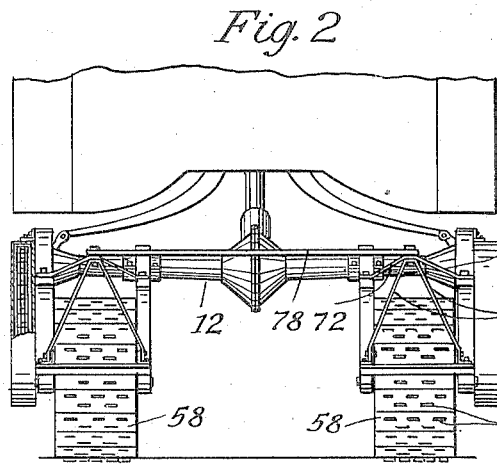
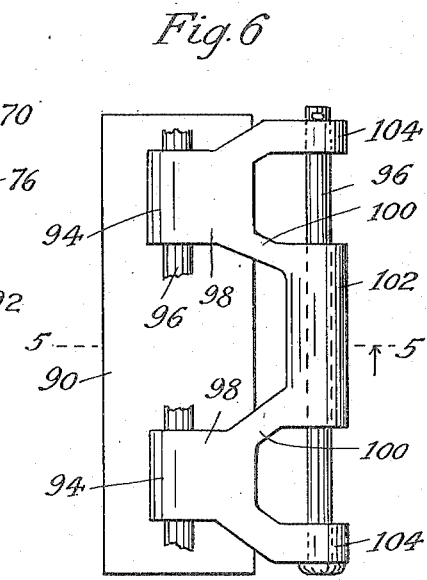
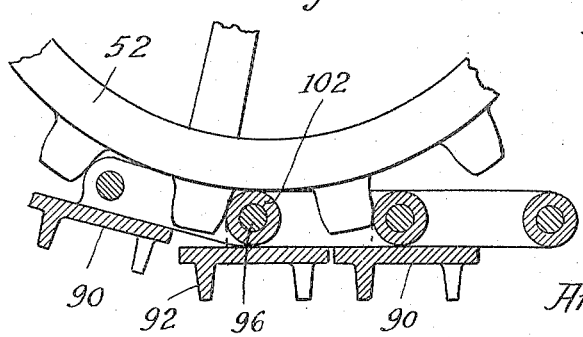
Inventor:
Andrew J. Peterson
By Whiteley and Ruckman
his Attorneys.

A. J. PETERSON.
TRACTOR BELT MECHANISM.
APPLICATION FILED APR. 11, 1918.
1,325,858.
Patented Dec. 23, 1919.
2 SHEETS—SHEET 2.
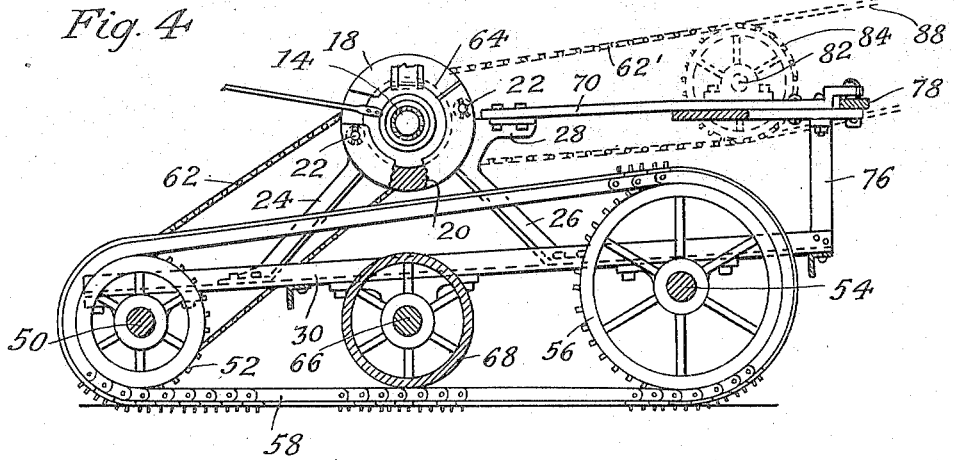
Fig. 4
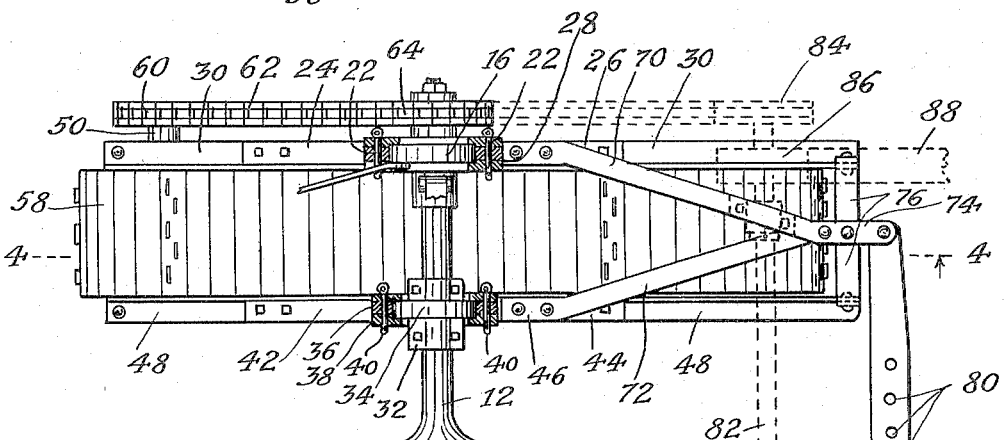
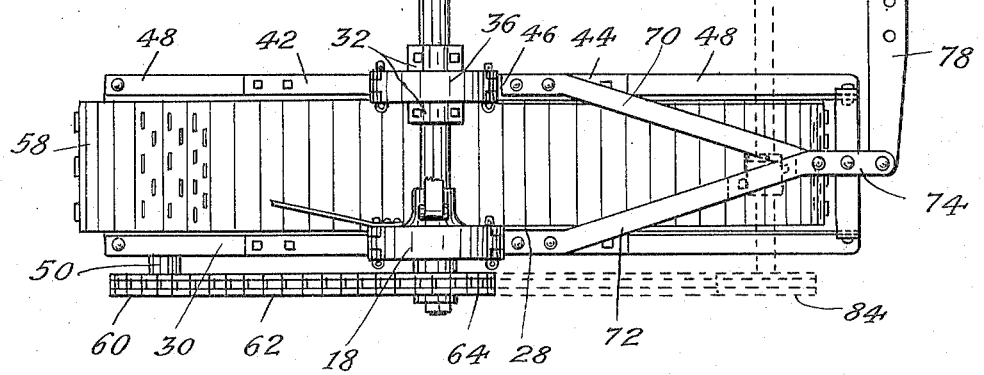
Fig. 3
Andrew J. Peterson.
By Whiteley and Ruckman
his Attorneys.

UNITED STATES PATENT OFFICE.

ANDREW J. PETERSON, OF ISANTI, MINNESOTA.

TRACTOR-BELT MECHANISM.

1,325,858.  Specification of Letters Patent.  Patented Dec. 23, 1919.

Application filed April 11, 1918. Serial No. 227,987.

*To all whom it may concern:*

Be it known that I, ANDREW J. PETERSON, a citizen of the United States, residing at Isanti, in the county of Isanti and State of Minnesota, have invented certain new and useful Improvements in Tractor-Belt Mechanism, of which the following is a specification.

My invention relates to a tractor belt mechanism, and more particularly to a tractor belt mechanism of the type which can be readily attached to automobiles. An object of this invention is to provide automobiles with an attachment which will give them a much greater tractive power than is possible when they are driven by the usual driving wheels, in order that automobiles may be used for hauling purposes and particularly for hauling farm implements. Another object is to provide automobiles with a stationary power device for driving various machines which are in fixed position.

The full objects and advantages of my invention will appear in connection with the detailed description thereof and are particularly pointed out in the claims.

Referring to the accompanying drawings, which illustrate my invention in a preferred form,—

Fig. 1 is a view in side elevation of an automobile having my invention attached thereto. Fig. 2 is a rear view of the same. Fig. 3 is a top plan view with certain parts in section. Fig. 4 is a view mostly in section on line 4—4 of Fig. 3. Fig. 5 is a sectional detail showing the links on line 5—5 of Fig. 6. Fig. 6 is a detail plan view of one of the links of the caterpillar belt.

10 designates the body of an ordinary automobile having the rear axle 12 as usual to constitute a casing for the driving shaft 14. The usual brake shoe flanges are designated by the character 16. To equip an automobile with my attachment I remove the rear wheels and attached brake drums and replace them with the structure now to be described. Each driving wheel is replaced by the same kind of an attachment and hence a description of one of these will suffice. Around the brake shoe flange 16 is secured an upper semicircular casting 18 and a lower semicircular casting 20 which are so shaped as to fit snugly upon the brake shoe flange as shown in Fig. 3. The two castings are secured together by pins 22 passing through interfitting hinge-like portions thereon. The casting 20 has formed integrally therewith two downwardly-extending arms 24 and 26 and an upwardly-extending arm 28, the ends of these arms being turned so as to extend substantially horizontally. The arms 24 and 26 incline forwardly and rearwardly, respectively, the arm 24 preferably being slightly longer than the arm 26. To the ends of these two arms is secured a channel bar 30, which, on account of the difference in length of the two arms, inclines slightly in a downward direction toward the front. Bolted to the rear axle approximately midway the brake shoe flange 16 and the differential casing are two semicircular castings 32 each of which has a semicircular flange, and these two flanges together make up a member 34 which is similar exteriorly to the brake shoe flange 16. To the member 34 are secured two castings 36 and 38, similar respectively to the castings 18 and 20, and which are secured together in the same manner by pins 40. They are provided with arms 42 and 44 similar to the arms 24 and 26 and with an arm 46 similar to the arm 28. To the arms 42 and 44 is secured a channel bar 48 similar to the channel bar 30. On the front of the channel bars 30 and 48 are bearings for a shaft 50 to which is secured a toothed driving wheel 52. On the rear of the channel bars are bearings for a shaft 54 to which is secured a toothed wheel 56. Around these two wheels is passed a traction belt 58, the construction of which will be described later. On the outer end of the shaft 50 is a sprocket wheel 60 over which passes a sprocket chain 62 which also passes around a sprocket wheel 64 secured to the driving shaft 14. The sprocket chain may be protected by a casing 65 as shown in Fig. 1. Between the shafts 50 and 52, a shaft 66 is mounted in bearings on the channel members 30 and 48, and to this shaft is secured a smooth wheel 68 to constitute a backing for the lower portion of the traction belt.

The arms 28 and 46 previously referred to have secured to them two bars 70 and 72 which converge and are secured together at their rear ends, and one of which is extended a short distance to form a longitudinal portion, as shown at 74. To the rear ends of each of the channel bars 30 and 48 is secured a brace 76, and these two braces converge upwardly and are secured to the member 74. A transverse bar 78 is secured to the two members 74 (referring now to the duplicate attachments on each side) and said bar is provided with a plurality of holes 80 to afford a drawbar connection. A shaft 82 is mounted in bearings on the bars 70, and on each end of this shaft is a sprocket 84. Secured to said shaft is a pulley 86 over which may be passed a belt 88 for stationary power purposes. When the machine is used for such purpose, the two sprocket chains 62 are removed from the sprocket wheels 60 and placed over the sprocket wheels 84, which will then be driven by the sprocket wheels 64, the sprocket chains in this latter position being designated by the character 62'.

The traction belts 58 are composed of links formed and connnected together as shown in Figs. 5 and 6. Each link comprises a tread plate 90 provided with a number of staggered lugs or spurs 92 on the lower side. Integrally connected with the upper side of the plate are two spaced hinge members 94 having openings to receive a pintle 96. Extending horizontally from the hinge members 94 are lugs 98 each of which is provided with arms 100 which carry the conjointly-supported hinge member 102, having an opening to receive one of the pintles 96. The lugs 98 are further provided with outer hinge members 104 having openings in alinement with the openings in the member 102 and spaced therefrom by a distance equal to the length of the hinge members 94, the latter being in turn spaced from each other a distance equal to the length of the member 102. The manner of assembling the links will now be readily understood and this is accomplished by placing successive links with the members 94 between the members 102 and 106 and passing a pintle through the alined openings in the hinge members. It is evident that when the links are assembled and the belt is in operation that the plates 90 fit snugly together while in contact with the ground and prevent dirt being forced upwardly around the hinged portions of the belt.

The advantages of my invention will be obvious from the foregoing description. An ordinary automobile can be quickly converted into a tractor having great hauling power, and the change back to an ordinary automobile can be just as readily effected. In addition, the attachment provides for a convenient source of stationary power. It is to be understood that various changes may be made in the form, proportion of parts and details of construction without departing from the spirit of my invention.

I claim:

1. A tractor belt mechanism comprising castings adapted to be secured together upon the brake shoe flanges at the end of the rear axle of an automobile, supporting members carried by said castings, toothed wheels journaled upon said supporting members, traction belts passing around said wheels and means for driving said belts by power from the driving shaft of the automobile.

2. A tractor belt mechanism comprising upper and lower castings adapted to be secured together around the brake shoe flanges at the ends of the rear axle of an automobile, arms carried by said castings, supporting bars carried by said arms, toothed wheels journaled on said supporting bars, traction belts passing around said wheels, and means for driving said belts by power from the driving shaft of the automobile.

3. A tractor belt mechanism comprising upper and lower castings adapted to be secured together around the brake shoe flanges at the ends of the rear axle of an automobile, forwardly and rearwardly inclined arms extending from the lower castings, supporting bars carried by said arms, toothed wheels journaled on said supporting bars, traction belts passing around said wheels, and means for driving said belts by power from the driving shaft of the automobile.

4. A tractor belt mechanism comprising upper and lower castings adapted to be secured together around the brake shoe flanges at the ends of the rear axle of an automobile, forwardly and rearwardly inclined arms extending from the lower castings, supporting bars carried by said arms, upper and lower castings adapted to be secured together around the rear axle at two places spaced from said brake shoe flanges, arms and supporting bars on said last mentioned lower castings corresponding to the aforesaid arms and supporting bars, toothed wheels between the pairs of supporting bars journaled therein, traction belts passing around each set of toothed wheels, sprocket wheels on the ends of the automobile driving shaft, sprocket wheels on the shafts of one of each set of toothed wheels, and sprocket chains connecting each set of sprocket wheels.

5. A tractor belt mechanism comprising a pair of supporting members adapted to be attached to the rear axle of an automobile near the ends thereof and in spaced relation to each other, toothed wheels journaled on each pair of supporting members, a traction belt passing around the toothed wheels of each set, means for driving said belts by power from the driving shaft of the automobile, bars extending rearwardly from each of said supporting members, and a transverse bar attached to the ends of said bars, said transverse bar being provided with a series of holes in any one of which a drawbar may be attached.

6. A tractor belt mechanism comprising a pair of supporting members adapted to be attached to the rear axle of an automobile near the ends thereof and in spaced relation to each other, toothed wheels journaled on each pair of supporting members, a traction belt passing around the toothed wheels of each set, sprocket wheels secured to the driving shaft of the automobile, sprocket wheels secured to the shafts of said toothed wheels, a stationary power shaft journaled on said supporting members, sprocket wheels secured to said last mentioned shaft, and sprocket chains adapted to connect the sprocket wheels on said driving shaft with either the sprocket wheels on said stationary power shaft or with the sprocket wheels on said toothed wheel shafts, as desired.

In testimony whereof I hereunto affix my signature.

ANDREW J. PETERSON.